US 8,812,561 B2

(12) United States Patent
Guido et al.

(10) Patent No.: US 8,812,561 B2
(45) Date of Patent: Aug. 19, 2014

(54) SYSTEMS AND METHODS FOR SHARING USER GENERATED SLIDE OBJECTS OVER A NETWORK

(75) Inventors: Oscar Guido, Los Angeles, CA (US);
Eduardo Prats, Burbank, CA (US);
Diego Prats, Burbank, CA (US); Nicolas LaCasse, Los Angeles, CA (US);
Spencer Tipping, Boulder, CO (US)

(73) Assignee: Border Stylo, LLC, Los Angeles, CA (US)

( * ) Notice: Subject to any disclaimer, the term of this patent is extended or adjusted under 35 U.S.C. 154(b) by 30 days.

(21) Appl. No.: 12/884,689

(22) Filed: Sep. 17, 2010

(65) Prior Publication Data

US 2011/0066636 A1    Mar. 17, 2011

Related U.S. Application Data

(60) Provisional application No. 61/243,431, filed on Sep. 17, 2009.

(51) Int. Cl.
*G06F 17/30* (2006.01)

(52) U.S. Cl.
USPC ........... 707/805; 707/769; 707/778; 707/917; 715/205; 715/234; 715/235

(58) Field of Classification Search
USPC .......... 707/769, 778, 805, 917; 715/205, 234, 715/235
See application file for complete search history.

(56) References Cited

U.S. PATENT DOCUMENTS

| | | | | |
|---|---|---|---|---|
| 5,724,595 A | * | 3/1998 | Gentner | 715/206 |
| 5,870,552 A | * | 2/1999 | Dozier et al. | 709/219 |
| 5,941,947 A | * | 8/1999 | Brown et al. | 709/225 |
| 7,562,302 B1 | * | 7/2009 | Barrus et al. | 715/730 |
| 8,244,755 B2 | * | 8/2012 | Carraher et al. | 707/770 |
| 8,533,238 B2 | * | 9/2013 | Yu et al. | 707/805 |
| 2004/0145593 A1 | | 7/2004 | Berkner | |
| 2004/0177002 A1 | * | 9/2004 | Abelow | 705/14 |
| 2007/0011140 A1 | | 1/2007 | King | |
| 2007/0073934 A1 | | 3/2007 | Rogers | |
| 2009/0276455 A1 | * | 11/2009 | Yu et al. | 707/102 |
| 2010/0253764 A1 | * | 10/2010 | Sim et al. | 348/39 |
| 2010/0332515 A1 | * | 12/2010 | Carraher et al. | 707/769 |
| 2012/0047119 A1 | * | 2/2012 | Kandekar et al. | 707/705 |

FOREIGN PATENT DOCUMENTS

WO    00-07110    2/2000

OTHER PUBLICATIONS

International Search Report for PCT/US2010/049321 Jun. 1, 2011.

* cited by examiner

*Primary Examiner* — Phong Nguyen
(74) *Attorney, Agent, or Firm* — Saul Ewing LLP

(57) ABSTRACT

In one embodiment, a method includes, in response to an address match in connection with a request for a target structured document, identifying one or more slide objects associated with the target structured document, the one or more slide objects defining a set of anchor point definitions in the target structured document; identifying one or more anchor points corresponding to the one or more slide objects in a document object model (DOM) representation of the target structured document based on the set of anchor point definitions; accessing content corresponding to the one or more slide objects; and rendering the target structured document and the content of the one or more slide objects proximal to the identified anchor points.

18 Claims, 12 Drawing Sheets

SYSTEMS AND METHODS FOR SHARING USER GENERATED SLIDE OBJECTS OVER A NETWORK

RELATED APPLICATION

The application claims benefit under 35 U.S.C. §119(e) of U.S. Provisional Patent Application No. 61/243,431, entitled "Systems and Methods for Sharing User Generated Slide Objects Over a Network", filed Sep. 17, 2009, which is hereby incorporated by reference in its entirety and for all purposes.

TECHNICAL FIELD

The present disclosure relates generally to networking and, more particularly, to systems and methods for enabling network users to share personalized content including objects designated "slides" which contain content directed to selected content objects, such as web pages, with other network users.

BACKGROUND

Computer users today are able to access vast amounts of information through various local and wide area computer networks. Through proprietary networks and the Internet, a user may access information from computer servers located in the same city, in a different state, or in a different country. One popular tool used for accessing and viewing information hosted on a network server is a web browser (e.g., Microsoft's Internet Explorer™ or Mozilla's Firefox™). A web browser is typically installed on a user's computing device and it allows the user to access information associated with a particular uniform resource locator (URL) at a network server. Modern web browsers feature intuitive graphical user interfaces that allow individuals without technical expertise to easily navigate from one website or webpage to another in pursuit of information the user desires.

While modern web browsing software has revolutionized the way individuals approach information retrieval over a network, such as the Internet, there are unfortunately many limitations associated with this software. Among these limitations is the relative inability of a user to contribute meaningful personal content to contacts and associates over the Internet without such functionality being built by any particular website itself. Conventional attempts to handle this issue have included making various information sharing technologies available, such as web logging, commonly enabled in the form of blogging sites (e.g., www.blogger.com), wiki sites that allow user collaboration (e.g., Wikipedia™), and social network sites (e.g., sites linked with applications whereby users view the profiles created by other users in standardized templates, and visibility is designated by some characteristic sets of "social rules"). Each of these platforms allows a user limited capability to share his or her views with others having access to the same network or web sites. These technologies share several important drawbacks, among which are that a user's views and/or accessible content are limited to a single website's data content. In these scenarios, a user's ideas are effectively walled off from content residing on other websites. When a user wishes to comment (e.g., with textual, audio, graphical, and/or video input) on content residing on a particular webpage data across multiple web-venues, to share personal content with his or her contacts and associates, these other forms of communication are of little use if contextual addition is part of the message. Typically, a user is forced to write his or her thoughts down in an email and then send them directly to another user. A composed email may include a hypertext link in the body of his email. This method of sharing comments is unwieldy. It limits the utility of the user's comments because the comments are not visibly positioned next to the web content of interest, and decouple context from the content, which may alter the message of the content.

SUMMARY

Particular embodiments enable users to define one or more slide objects that, when processed by a client-side application, are operative to overlay content (such as comments, multimedia objects, and the like) on viewed web pages and other structured documents. Embodiments of the invention allow the user to personalize content that they deem noteworthy or otherwise desire to share over a network such as the Internet, including various content based web pages. By way of example, a user may add a slide object including content to be displayed proximal to content of interest in an underlying content object, such as a web page or other structured document. The slide object can include text, hyperlinks, multimedia objects, code modules, and any other suitable content. In one example embodiment, personal content in the form of a slide object is presented to viewers directly over a website. Particular embodiments enable users to pick and choose which slide objects from other users they would like to view when they are browsing the Internet or other networks. By way of example, users can become contacts or otherwise establish relationships over the same social network and their collective comments can be viewed amongst selected members of their social network in both present and future network browsing sessions. In some implementations, the functionality underlying particular embodiments can be realized as a browser plug-in software component to a user's existing web browser application.

Particular embodiments may include a dedicated web server. Such an example server can provide a central location for users to manage their personal "activity pages" which serve as a repository of content viewable by the user (whether created by the user, or another user) as well as a user-controlled interface for preferences. In particular embodiments, a user can browse the activity pages of other users and select to send messages directly to the other users when the user wishes to communicate desired informational content. In particular embodiments, a user is also able to see which websites have been recently augmented by slides with personal content and, furthermore, which users of their network created said slide-centric content. The web server may also allow users to view their account data, and the content-creation data of other users, by logging in using a browser client or a plug-in application.

In some embodiments, this or another server may also store comments entered by various users along with the coordinates, such as, by way of example, Cartesian coordinates, (e.g., horizontal and vertical pixel point coordinates) associated with each comment as selectively positioned relative to webpage content augmented by slides. In particular embodiments, slide objects are stored in a document object model (DOM) representation. In this way, the comments may be recalled for positional display over the same webpage when another social network user elects to view comments for the same webpage with their own web browser application. The presentation of personal data content to a particular user may take place without any required actions on the part of the user for requesting the presentation to occur. By way of example, a user can simply log into the slide object service and then browse a website using a browser client, while a browser plug-in application communicates with the dedicated server, thereby affecting displayed content of one or more web sites to which the browser client may navigate.

Some embodiments may also include capabilities to greatly increase the effectiveness of directed advertising displayed to a user during web browsing activities via identifying websites and virtual localities which may provide higher value for advertisers for their particular products or services. By way of example, the website content augmented by slides by each user may be grouped with other slides and websites to create a "story" of user's psychology. In an example embodiment, both comments created by a user and comments viewed by the user may be tracked and analyzed for the purposes of matching pointed advertising schemes to either certain personas of users or by identifying websites which represent certain ideas or topics not explicitly stated in the underlying website's content, but are more properly weighed to particular content via the addition of user-generated slides even though the underlying website.

BRIEF DESCRIPTION OF THE DRAWINGS

Particular example embodiments are described in detail below with reference to the following Figure drawings.

DESCRIPTION OF EXAMPLE EMBODIMENTS

Figure 1A:
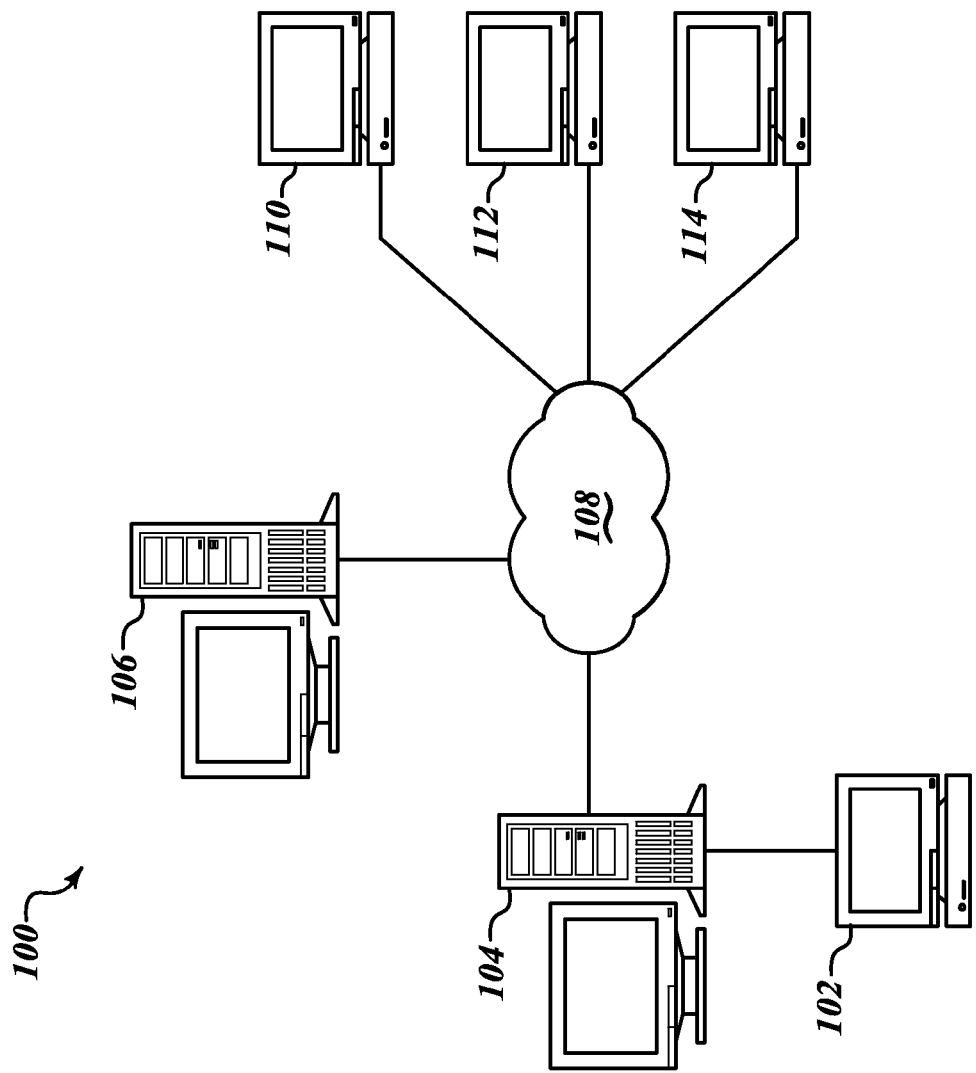
FIG. 1A illustrates an example networked computing system in accordance with an embodiment.

In particular embodiments, a web browser plug-in application is utilized to facilitate content or object-selecting over selected structured documents, such as web pages of interest, as well as viewing slide objects authored or generated by other users. Some embodiments also relate to generating valuable anonymous, aggregate metrics associated with various users' content-creating histories. Particular embodiments provide a means for users to post and share personal or non-native content on a given webpage with other selected users having access to the same webpage or other content object. Particular embodiments also provide a webpage interface that enables users to view personal content slide objects made by both themselves and others within the same viewing media. Some embodiments further provide a means for third party advertisers to use the information derived from the aggregated users' online content-creating activities, along with their network's slide-creating activities, to generate directed advertising campaigns, including by not limited to assessing which web sites may be more favorable for a given advertising campaign. In this way, particular embodiments add another level of interactivity amongst users of social-networks and the World Wide Web, and greatly improve each user's own Internet experience. Particular embodiments work seamlessly and operate in tandem with existing software already residing on a user's computing device. In this manner, a user will not have to relearn new software or switch out of their browser program to utilize different aspects of particular embodiments.

In accordance with particular described embodiments, systems and methods for allowing a user to attach comments and media data content (e.g., including, but not limited to, textual, audio, graphical, and video content) as slide objects, to various content objects, such as web pages, is provided. In various example embodiments, the system includes, but is not limited to, one or more client devices having both a web browser and a browser-based application in the form of, by way of example, a plug-in software application executing in the context of the browser or as an extension to the browser, one or more server devices storing the webpage, and a network facilitating data communications between the at least one client device and the at least one server device. The client device is configured to access the webpage over the network with the web browser, create a slide object with the browser-based application, and then associate the slide object with the webpage and the user. In one implementation, the server device is configured to store the slide object as well as positional data corresponding to the slide object, and then retrieve the stored slide object and the positional data in response to a request of a second user. In various example embodiments, users each have a personal website account stored at the server device that may include self-generated slide objects, slide objects generated by other users, or a group of slide objects associated with the same webpage content. In a particular implementation, users can independently alter slide object content by logging in to their respective personal website accounts and accessing the content of any particular slide objects. The creation of a slide object with the browser based application of the client device, may include placing the slide object at a specific positional location over the webpage and setting the specific positional location to the positional data.

As described above, a method for associating a directed advertising scheme with a user may include tracking a user's content-creating or commenting activities over a web browsing session, storing tracking information associated with the web browsing session, and then analyzing the stored tracking information to determine information relevant to a directed advertising scheme, such as information relevant to the web properties to target and information related to relevant advertisements to display over a webpage being viewed by the user. In various example embodiments, the content-creating activities also include the user associating various slide objects with several web pages viewed during the web browsing session, and the stored tracking information includes information related to a content-creating path amongst the web pages commented during the web browsing session. At least one relevant advertisement may include content in the form of textual, audio, graphical, and video data.

In accordance with an example embodiment, FIG. 1A illustrates a computer network 100 including several distributed computing devices 102, 104, 106, 110, 112, and 114. In the illustrated embodiment, computer network 100 includes client devices (or systems) 102 and server devices (or systems) 104, 106, 110, 112, and 114. The client devices 102 are computing devices generally used by an end user. These client and server devices 102, 104, 106, 110, 112, and 114 may generally be any directed, special or general purpose computing devices or systems capable of communicating through a wireline or wireless network 108, examples of which may include, by way of example and not by way of limitation, personal computers, server computer device or systems, laptop computers, cell phones, smart phones, personal electronic devices, set top boxes, and gaming devices. Client device 102 may generally connect to other devices through a dedicated service provider 104. The service provider 104 (e.g., an ASP, ISP, MSP, or TSP) is typically a server, router, gateway or set of servers, routers, and gateways, that provide various service resources to the client device 102. The service provider 104 also generally provides access to other network resources through network 108.

In an example embodiment, the network 108 may be a private or proprietary network, a series of interconnected proprietary networks, a public network, or the Internet, or any combination thereof. Through the network 108, the service provider 104 and computing devices connected to the network 108, such as the client device 102 may gain access to the offered computing resources of servers 106, 110, 112, and 114. One or more of servers devices 106, 110, 112, and 114 may provide a variety of specialized services including, but not limited to, email, data file transfer, or webpage serving. By way of example, server 106 may also be capable of maintaining software and hardware resources necessary to implement example embodiments. Server 106 may utilize any commonly used operating system including, by way of example and not by way of limitation, UNIX™, Linux™, and Windows™. In a particular embodiment, server 106 is a repository of various public and/or personal home pages associated with the various example embodiments. In conjunction with software residing within the client device 102, the utilities and applications residing on server 106 enable a user of client device 102 to manage to his or her personal service accounts and to add or view slide objects (slide objects and comments are used interchangeably herein), to public or personal content objects, such as web pages and websites.

In an example embodiment, server 106 may be responsible for storing comments and making them available to a client device 102 when appropriate or necessary (e.g., when a third party request is made to view the comment). Like the other servers on the network 110, 112, and 114, server 106 may be implemented on a bank of computers. Other servers may also be present on network 108 to provide computing resources and application information to distributed computing devices through the network 108. Other client devices 102 may also be connected to the service provider 104 at any given time to facilitate data transmission and retrieval. There may also be multiple service providers and client devices connected to network 108 at any given time. The connections between the client computing devices 102, service providers 104, and servers 106, 110, 112, and 114 may generally be implemented using any wireless or wireline technology or a combination thereof including but not limited to Wi-Fi, 3G and 4G, or satellite wireless networks, WAN and LAN wireline networks, including, coaxial cable, fiber optic cable, telephone line, or power line cable.

Figure 1B:
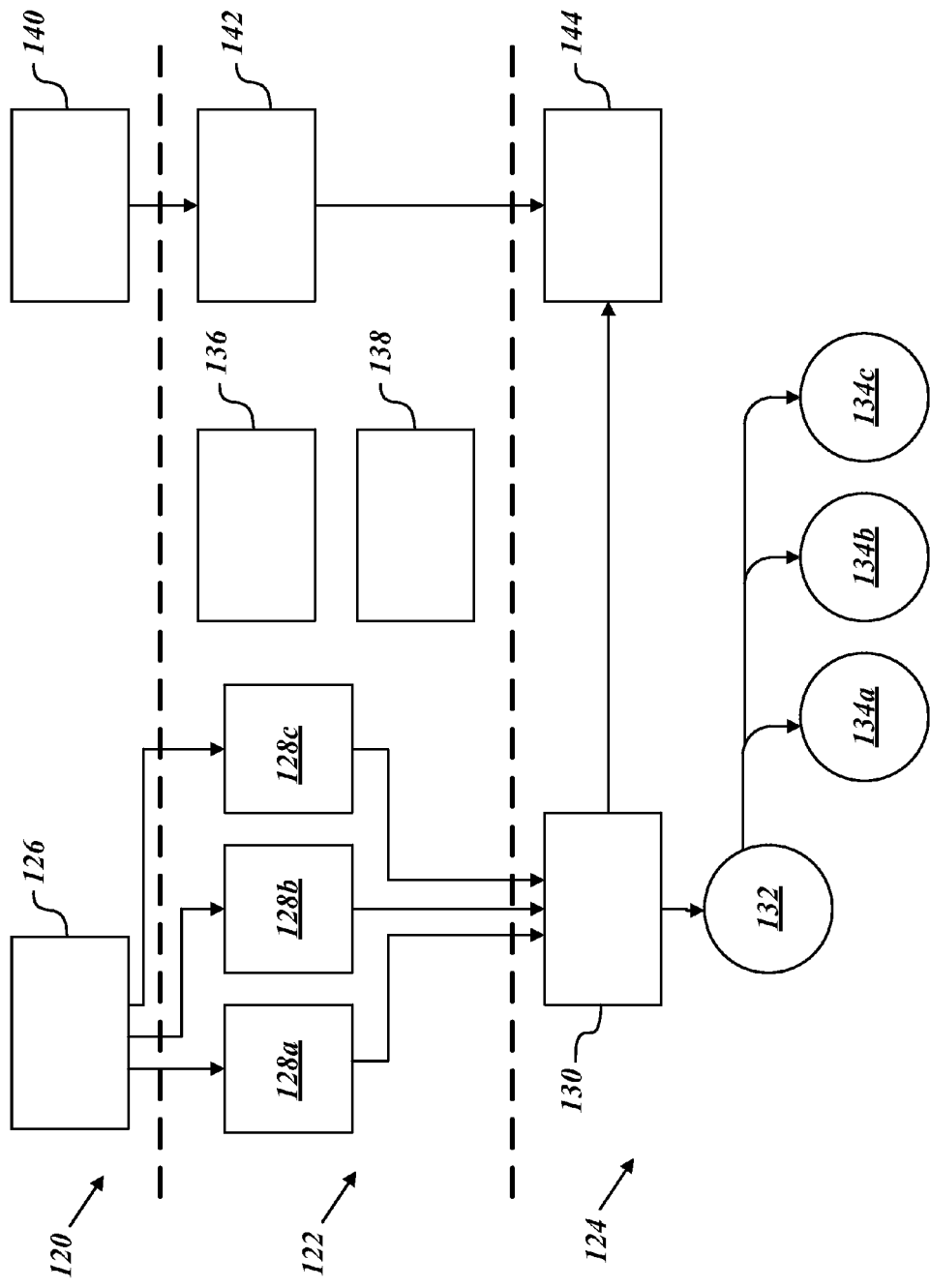
FIG. 1B illustrates an example embodiment of a network architecture in accordance with an embodiment.

An example network architecture is described with respect to the system illustrated in FIG. 1B. The system of FIG. 1B comprises a multi-tier architecture that includes a front-end tier 120 that relies upon browser-based applications to facilitate client-side website interactions (e.g., user input along with browser-based application and webpage output display), a middle-tier 122 incorporating one or more network servers for data processing and system resource allocation, and a back-end tier 124 incorporating one or more network servers having one or more system databases (e.g., any combination of volatile or non-volatile memory resources) for storing various system resources that can be accessed and/or allocated by instruction from the system middle-tier 122.

In an example embodiment, the system of FIG. 1B includes a client 126 connection to the client database (CDB) content through load-balancers 128a-c. The load balancers 128a-c of the network architecture shown in FIG. 1B may be used in high-demand environments. For enterprise-level systems, single servers may be ineffective for some embodiments. By way of example, the website may receive too many queries at any given time that a single server would be overwhelmed. Multiple servers can handle many more queries simultaneously and therefore may improve the overall experience to the end users. When multiple web servers are deployed to handle traffic to a single site, load balancers 128a-c distribute the traffic load amongst them. This is a primary function of the load balancers. The load balancers 128a-c determine the route and destination of various instructions from the client to respective database servers 130. Servers within the mid-tier 122 may include Web server functionality that communicates with Web browser applications controlled by the client. The load-balancers 128a-c can maintain a constant, permanent connection between the client 126 and the servers using remote procedure call over HTTP. This connection further allows for communication between the back-end 124 and the client 126.

In an example embodiment, the back-end 124 may include a CDB content server 130 for storage of system resource data. The CDB server 130 can include a plurality of database clusters 132, 134a-c. Each cluster may include a master CDB 132 which may link to and/or control several slaves CDBs 134a-c. The clusters maintain system data redundancies of identical information such that all resource data is duplicated amongst the master 132 and the slave 134a-c CDBs. The system is able to differentiate between the master and slave CDBs of various clusters. The level of redundancy in the system may be controlled by a system administrator or automatically from the master CDB. The database clusters may be fully redundant in which case a complete and faithful copy of the master CDB is stored in the slave CDBs as well. This configuration gives the system protection against failure of any one database because all the system data may be stored in multiple places. Another advantage of using full redundancy between master and slave CDBs is that any system database can handle a read request from the web servers or load balancers. In one example embodiment, while write requests must always be handled by the master database to ensure coherence between all CDBs, any CDB can handle a read request. This makes this configuration especially efficient because several requests for information can be handled simultaneously. Alternatively, there may be no redundancy between each of the CDBs. In this configuration, each CDB retains a different portion of the logical database. All read and write requests may be handled by the master CDB because the master CDB may contain a master table that allows it to forward the request to the proper slave CDB.

In particular embodiments, a user is able to generate personalized content in the form of one or more slide objects directed to a content object (such as webpage or website), including but not limited to a comment, highlighter function, images, and audio or video content. In particular embodiments, a plug-in software component executing within the client 102 is operative to capture data, such as the URL of a requested page, anchoring data describing an anchor point from which an overlayed comment or other content embodied in a slide object is rendered on the page, an access control list (ACL), slide object's identity number, and user-generated content corresponding to the slide object(s). The ACL provides a list of all users that have been allocated read and/or write permission for individual user generated content. The ACL may identify users individually or in relation to user groups. For example, when commenting or overlaying slide objects on a given web page, a user may identify a set of individual users to view the slide object or identify certain groups, such as "all contacts," or a configured subset or group of contacts. As can be seen in FIG. 1B, user generated content data is sent to the CDB Master which propagates the data to the CDB slave. The CDB clusters then check the ACL against the User Database (UDB) 144 to determine the selected readers of the data, so this data can be accessed by the permitted user(s).

In particular embodiments, Website 140 is able to communicate with server 142, which may also be found in the middle tier 122 of the network hierarchy. Through the server 142, the Website 140 is also able to check authentication of users. In this network embodiment, the UDB 144 can control access to data. When information necessary to fill requests in line with the implementation of example embodiments is stored at a system database (DB) server, the UDB 144 may act as a gatekeeper. It maintains records of users of the system and also keeps track of relationships between the users. In particular embodiments, the UDB 144 controls which users have access to which posted slide objects and may ensure that users do not see unwanted or irrelevant slide objects and that only their trusted parties are able to see their slide objects.

Some embodiments may also include Notification Server 136 and Message Transfer Agent (MTA) 138. Both of these servers may act as bridges between the middle-tier 122 and the clients 126 at the front-end tier 120. The Notification Server 136 is aware of various user settings and preferences (e.g., email preferences) and notifies the MTA 138 when a new notification request has been processed. In an example embodiment, this notification includes instructions as to the source and recipient address of a message as well as the message content. The MTA 138 passes notification messages between components of the middle tier 122 and the clients 126 at the front-end tier 120.

Figure 2:
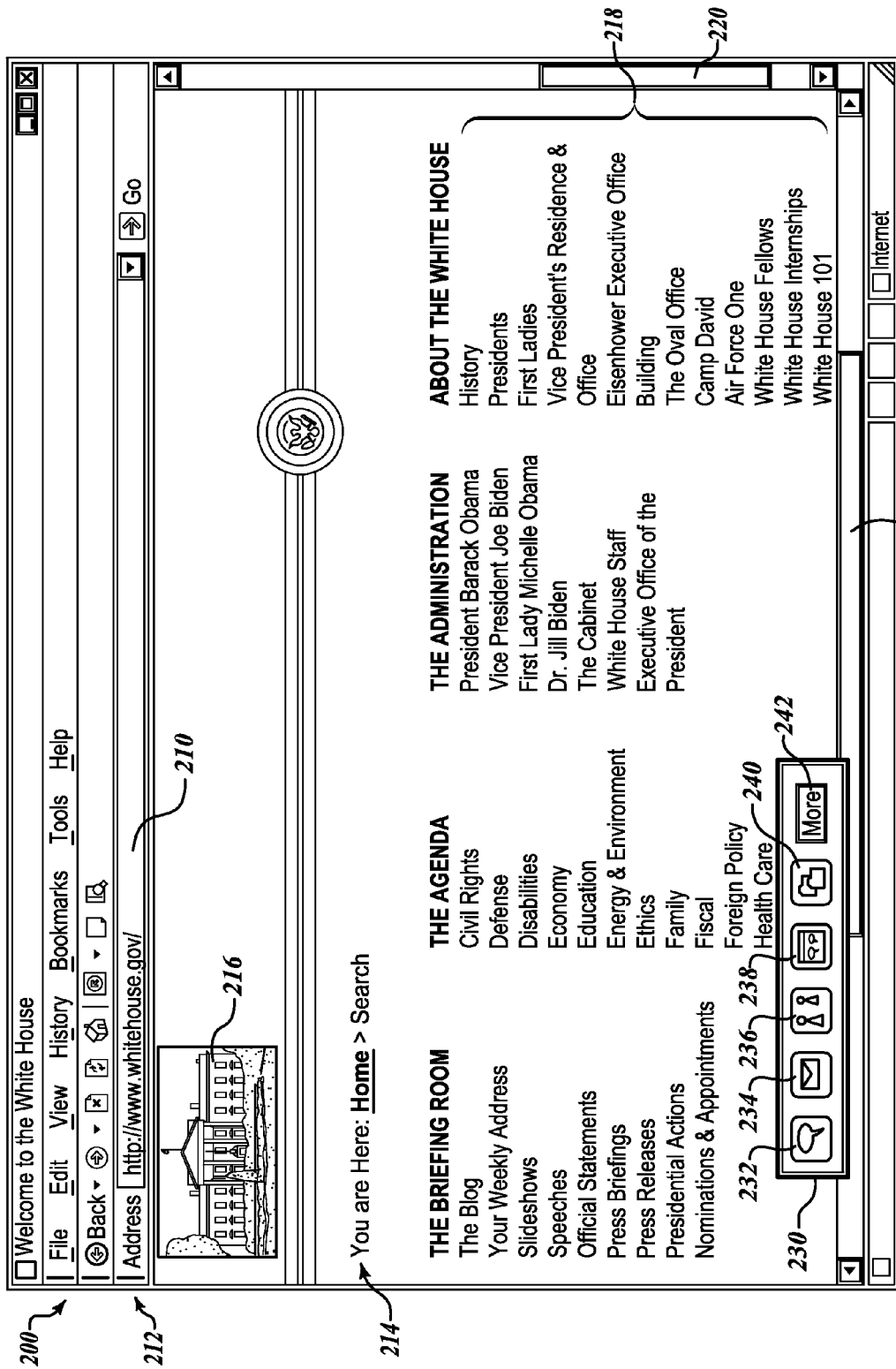
FIG. 2 illustrates a view of an example graphical user interface showing a browser based plug-in application in accordance with an embodiment.

In accordance with a particular example embodiment, FIG. 2 depicts a view of a graphical user interface 200 displaying a given website, along with a browser-based application 230. In various embodiments, the graphical user interface 200 may be implemented by a common or conventional web browser as a web browser application that operates in conjunction with website 140. A web browser application is generally a computer program configured to run on a user's computing device (i.e., client device 102) that enables the user to connect to various server hosted web pages available over the network 108. A non-exhaustive set of common web browsers include, by way of example, Internet Explorer™, Firefox™, Safari™, and Opera™. The web browser programs provide a standard viewing window 214 that displays the informational and visual content of the website (the term "website" and "webpage" are used interchangeably herein). The URL of the content object presently being rendered and viewed is displayed in the address box 210 of the web browser graphical user interface 200. Address box 210 enables a user to input an address (e.g., URL) for a desired content object, such as a webpage. The content of the website generally includes graphical images 216, text and hyperlinks 218. In various example embodiments, the webpage can also include audio, video, and other types of web content. The hyperlinks 218 allow a user to jump to another portion of the same webpage or to another webpage altogether without requiring manual input of a desired webpage's address. To further enable the user to navigate the rendered page, scrolling bars 220 and 222 are generally included. By clicking and/or dragging these bars or buttons, a user may selectively view other portions of the webpage, which do not entirely fit the immediately viewable areas of the graphical user interface 200. Browser-based application 230, in one implementation, is operative to cause the browser to display a graphical toolbar menu to provide the user with the slide creation/commenting functionality of particular embodiments.

In a particular embodiment, browser-based application 230 is implemented as a compatible plug-in to the browser software installed in client 102. A plug-in generally includes a computer program that interacts with a host application (such as a web browser) and executes in the context of the host application or as an extension to the host application to provide one or more additional functions to the user without the user exiting the host application. By way of example, the functions and features of the plug-in may be displayed to the user in such a way that they appear to be an extension of the native functionality of the host application. Plug-ins may provide additional functionality supplied and supported by third parties. Plug-ins interact with the host application through application programming interfaces. The host application supplies information through the interfaces that allow the plug-in to execute properly. There are often many advantages of using plug-ins for development and to provide services to users. Plug-ins can be developed and implemented without altering the host application. Furthermore, plug-ins can be added and deleted dynamically by the user without affecting the operation of the host application. Plug-ins can also be used to provide functionality for the host application that was not envisioned when the host application was developed. Of course, in other implementations, the content-creating and display functions described herein can be incorporated into the browser application itself.

Browser-based application 230 provides an interface that enables a user to add content, such as a comment, as an overlay to a currently rendered webpage. More particular, as will be described in more detail below, a user may highlight or otherwise select a portion of text or other content from which to anchor a slide object that embodies text and/or other content added by a user. In particular embodiments, the browser-based application 230 causes an interface to be generated that includes, by way of example, a 'new comment' button 232, a 'notification' button 234, a 'contacts' button 236, a 'this page' button 238, a 'settings' button 240, and a 'more' button 242. These buttons may further provide access to other options, typically organized in menu form, available to the user. For instance, in an example embodiment, the 'new comment' button 232 brings up (e.g., causes to be rendered) such options as creating a new comment or slide object or a highlighter function that enables a user to highlight text or images or, alternately, a target mode in which whatever DOM element or node the cursor is positioned over is highlighted thereby facilitating the positioning of an anchor point of a slide object with a desired object. In some embodiments, while in such a target mode, the rest of the document (other than the DOM node or element the cursor is positioned over) is made gray or less visible (more opaque) relative to the object of interest. This may, for example, be achieved by modifying the Cascading Style Sheet (CSS) properties of the structured document.

The 'notification' button 234 provides the user with further options such as the option to view slide objects created by other users to which he or she has been given access. The 'notification' button 234 allows a user to view such comments, similar to an "activity" page of a web site without having to login or otherwise access the web site directly. The 'contacts' button 236 enables the user to manage the other users (e.g., "contacts") in his or her personal ("social") networks. The menu or options affiliated with the contacts button 236 may include updating contact lists, forming user or comment lists, or deleting contacts. The 'this page' 238 button provides the user with the ability to organize the viewing of comments, content and highlights on the present (e.g., currently rendered) page. By way of example, utilizing options found in the sub-menus of button 238, the user is able to filter slide objects attached to the website, alter the look and feel of the slide objects and highlights on the webpage, a scatter option, or block slide objects posted and attached to the present webpage. The filtering of the slide objects and the other actions taken by the users pertaining to the presently viewed webpage can be based on a variety of methods. For instance, slide objects and highlights can be filtered by a user or by attributes shared by certain users. Also, slide objects and highlights can be filtered by time of posting or frequency of postings by the user. Other filtering methods and attributes may also be employed without limitation. The 'settings' button 240 enables the user to update other aspects of his or her account. Options found in the settings sub-menu may include, by way of example and not by way of limitation, log-in and log-off options and account settings options. The 'more' button 242 allows for further options to be available to the user without necessarily taking up any more space on the display. The 'more' button may also include updateable or temporary functionality associated with example embodiments.

In a particular example implementation, the menu utilizes a menu/sub-menu system. By way of example, each button in the root menu 230 triggers into view a submenu with the listed options and, potentially, others. These menus in turn may also include submenus of their own. Also, they may include selectable options, check boxes, or text boxes that allow the user to interact or configure various embodiments. However, embodiments of the present disclosure are not limited to a menu/submenu interface and can be implemented in a variety of other ways. For example, in other embodiments, the options for each of the buttons may be implemented with additional toolbars. The options available under each button may be implemented with text or with graphical representations. Also, the root menu 230 and its submenus or children toolbars may be persistent or hideable. They also may be rooted somewhere on the screen or may be allowed to float around the graphical user interface of the browser without any fixed position. Furthermore, the look and feel of the menuing system may be customizable by the user.

Figure 3:
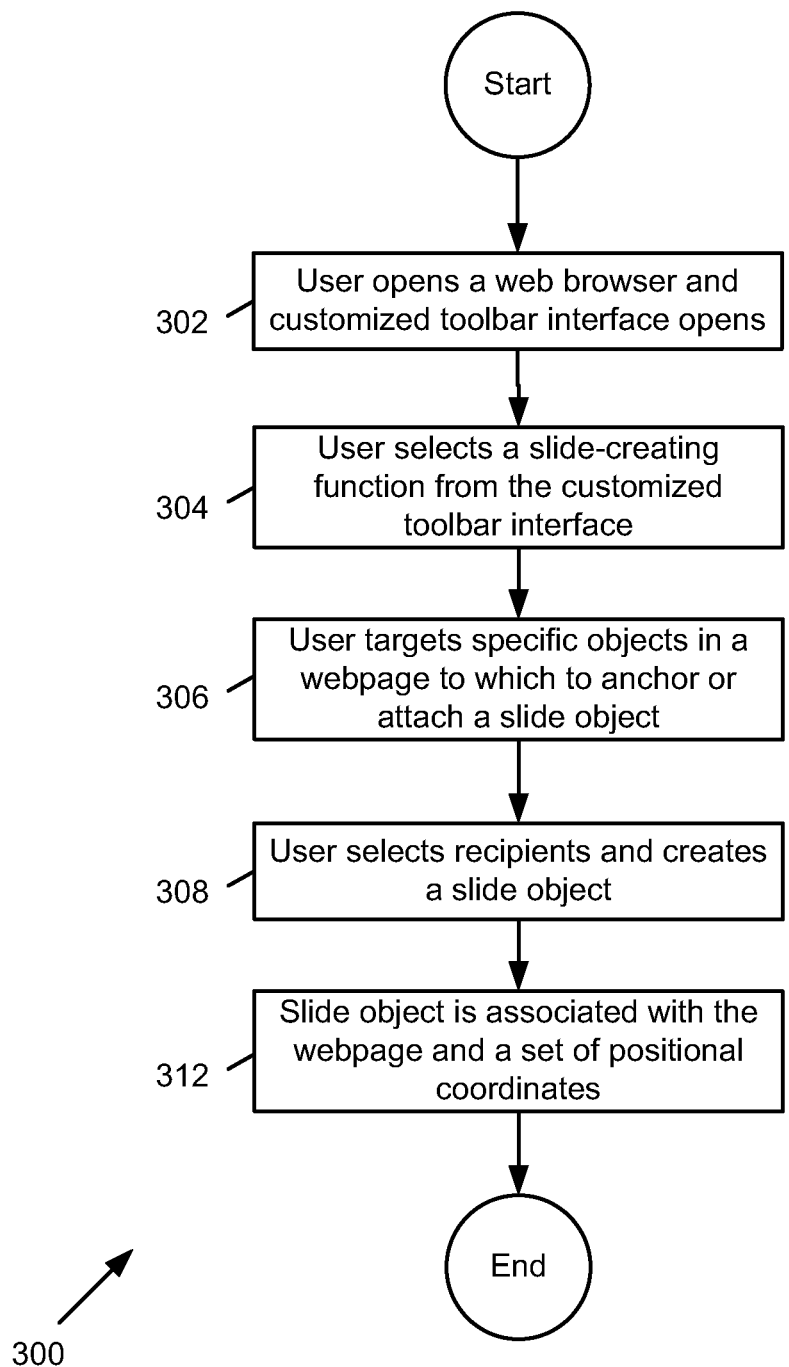
FIG. 3 illustrates a flowchart illustrating an example method for adding a slide object to a webpage in accordance with an embodiment.

FIG. 3 depicts a flowchart 300 illustrating an example embodiment of a method for generating a comment for a webpage. The process begins at 302 when the user opens a web browser with the customized tool bar interface associated with application 230. From the customized user interface, the user selects the slide-creating function at 304 that enables the user to create a new slide object. The user may then target specific objects (e.g., a picture, video, window, etc.) or portions of text (e.g., a word, group of words, sentence, paragraph, etc.) at 306 to which to anchor or attach a comment or other slide object as just described above. At 308, the user selects recipients for the comment and creates the slide (creates and adds the comment text or the slide object). The slide object is associated with the webpage as well as the position for the content of the slide at 312. In one particular embodiment, the position is stored as a set of positional coordinates and/or a set of anchor points and a set of positional coordinates that define an offset.

More particularly, in particular embodiments, application 230 stores or causes the browser to store the slide object in a document object model DOM representation either locally in the client 102 or remotely in a database in or accessible by client 102 (such as the servers described above). By way of reference, when a page is requested by the browser, HTML code is transmitted to the browser so that the browser can render the requested page. However, and in accordance with particular example embodiments, the browser first constructs a DOM representation equivalent of the HTML content for the page. The DOM is generally arranged hierarchically in the form of a tree of DOM elements or nodes, as will be appreciated by those of skill in the art. The browser then renders the page in the particular client viewing window of the browser utilizing the DOM representation. All the text and other content specified in the underlying HTML code is translated by the browser into DOM elements of finer and finer granularity. By way of example, at a first level, the entire document (page) may be represented by a DOM root node. Progressing down the tree, the document may include a picture, video, interactive window, block of text, and/or other content including scripts and various calls to APIs represented in finer and finer detail by subsequent level nodes. In a particular implementation, application 230 effectively operates in conjunction with a canvas element of the underlying HTML (e.g., canvas element specified as part of HTML 5).

When a user desires to select an object for reference, the user selects (e.g., via a mouse cursor) text or other objects by highlighting or simply placing his or her cursor over the object where the user desires to anchor the slide object as described above. The former may involve the application 230 determining the smallest DOM node or set of DOM nodes that contain the desired text. Application 230 then calls an API that provides application 230 with the positional information for the text or object of interest from which to anchor the slide object. By way of example, in a particular embodiment, application 230 calls the API getBoundingClientRect executing within the browser that then determines the position of the underlying DOM node(s) corresponding to the text or object of interest from which to anchor the slide object. The getBoundingClientRect returns a value that may include the left, top, right, and bottom positional coordinates or properties (or the position of one corner as well as the width and height) of the box or rectangle characterizing the position of the DOM node(s) within the page layout rendered by the browser for the particular user's viewing window (e.g., size and aspect ratio of the viewing window in DOM representation). In addition, the user may move the position of the text box that appears and contains the content added by the user relative to the anchor elements defined by the user. The distance vector defining the offset between the bounding box of the anchor DOM elements and the comment box can be stored in association with the slide object as well. Application 230 may store or cause to be stored either locally or remotely the slide objects including such information as: the slide creator (e.g., user responsible for making the slide object), the positional coordinates in the DOM representation returned by the getBoundingClientRect API, any deliberate offset (e.g., in pixels) chosen by the user between the comment and the underlying anchor object (e.g., the one or more DOM nodes that comprise the anchor text or object), the anchor DOM elements identified by the user and/or the application 230, as well as the comment (e.g., user-generated content itself) entered by the user for display with the slide object. After the user defines a given slide object, the application 230 may modify the DOM representation of the page (without necessarily modifying the HTML or other markup language code or content transmitted to the browser—this is generally stored separately) to include the slide objects.

In addition, the slide object data may also be transmitted to a central database or other remote hosts for display on browsers of other users as they encounter the same underlying page that corresponds to the URL of the current page. Still further, server 106 may also access the database of slide objects to publish a content-creating activity feed when users access web pages corresponding to the service provided by server 106. For example, when a user accesses an account home page, for example, the server 106 may access a database of slide objects and assemble a feed of slide objects where the user is identified in an ACL or otherwise allowed to view the slide objects. The feed can be restricted to the latest N objects. Other filters can also be used as well. Accordingly, a user need not use the plug-in application 230 to view slide objects. In addition, a user, accessing the web page showing the slide objects, can respond to slide objects by accessing a slide object within the context of the activity feed page. For example, using AJAX or similar technologies, the user can select a given slide object and add content in response to one or more comments or other content associated with the slide object.

In an example embodiment, the client captures pertinent anchor points such as images, links, and words and records the relative distance and location of those points. This anchoring data is stored in association with the slide object that also includes other data, such as text comments and other content added by the user. One form of anchoring uses a target anchoring process. Data is scanned from a radius of a particular targeted word, or other anchored element, at exponentially increasing intervals to pick up words and offsets or derivatives of those words or elements. The target element is found by retrieving the previous anchor data including all occurrences of the target word or element. The target word with the least deviation from the expected offsets is chosen after log-transforming the observed and expected offsets and squaring the differences. Another form of anchoring uses dynamic content anchoring process which indexes picked up words or elements to a slide object identity. Then for each page load, slide objects whose anchor point definitions match the words or elements on the page are found. A distance function and confidence function is computed. Selected or anchored elements that have a confidence above a predetermined threshold are then displayed. The present invention is not limited to these methods of anchoring comments. Furthermore, these methods can be used in conjunction with each other or others to facilitate the placement of the comments.

Figure 4:
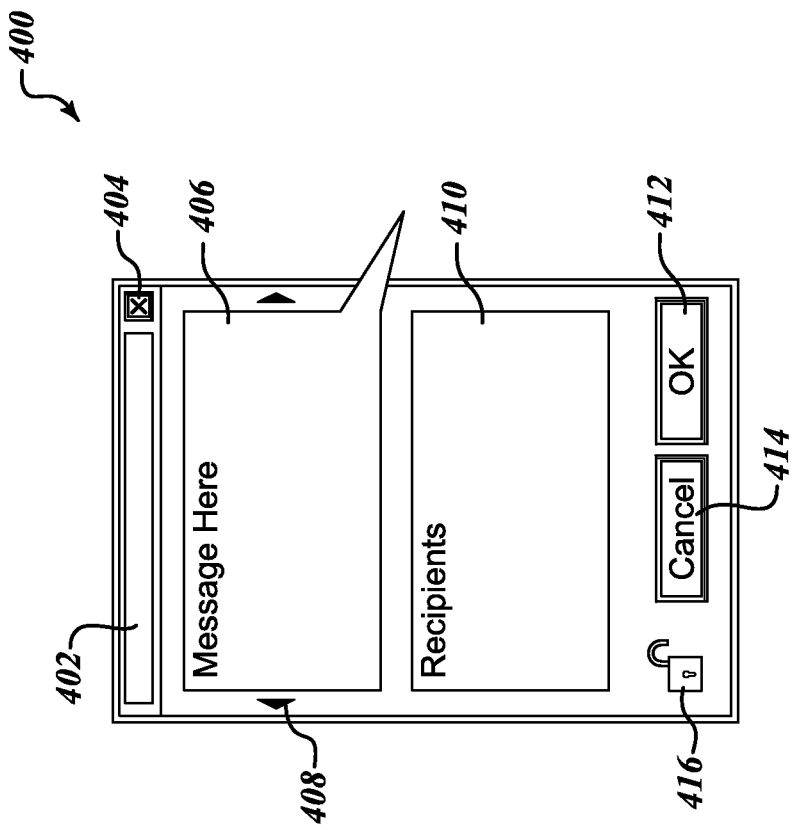
FIG. 4 illustrates an example graphical interface component of a browser based plug-in application in accordance with an embodiment.

FIG. 4 illustrates a slide object generation interface 400 in accordance with a particular example embodiment. Text box 402 enables the user to give a particular slide object a name or title. Button 404 provides an option to the user for canceling the comment and eliminating the new message interface from the screen. Text box 406 provides an interface enabling the user to input the body of his or her message. Tabs 408, shown on either side of the slide (or message box), enables the user to scroll back and forth and view other parts of the message not presently viewable in the text box (e.g., due to the size or aspect ratio of the text box). In particular, such a feature may greatly facilitate the user's ability to alter the text of the message or to proofread the message. In text box 410, the user is able to create the list of recipients for the slide object. These are the other users that when active on the network will be able to see comment once it is successfully completed. When the user is finished with the slide object and has selected the recipients, the user may select the OK button 412 to finalize the message and post it to the website. In a particular embodiment, once the message is posted, the user interface shell 400 is no longer displayed. If the user wishes to cancel the message, the user may select a cancel button 414. Similarly, once the cancel button is selected, the user interface shell may no longer be displayed. The lock button 416 gives the author of the comment control over how others can interact with the comment once it is posted. In particular embodiments, if the comment is locked, no other user can alter or add to it. Conversely, if the comment is unlocked, other users may be free to add to it once it is posted.

The features just described and illustrated with reference to FIG. 4 are not meant to be limiting. Additionally, in some embodiments, not all features shown may be present. Furthermore, other features may be present in the slide object authoring user interface. In one example embodiment, the message box 406 may house features common in text authoring programs such as spell check and grammar check. The message box 406 may also include features that allow for formatting of the text or include special effects such as smiley faces, among others. Additionally, a user may be able to modify the slide object's visual transparency relative to the underlying HTML content of the page. By way of example, application 230 may modify the CSS properties of the slide object such that the slide object content is partially transparent. The interface may also provide a toggle function that enables users to toggle slide objects on and off; that is, to selectively show and not show various slide objects (this may be achieved by modifying the opacity of the drawings using CSS properties). The message box 406 may further offer options that allow for graphical representations or drawings to be made. Furthermore, in additional or alternate embodiments, the message box 406 may include options for posting multimedia comments or other content. These options may enable a user to record an audio and/or a video comment, for example. The message box 406 may allow the user to create multimedia comments or to create a comment out of one or more saved files of various types and formats. In particular embodiments, the recipient box 410 may also include additional features. By way of example, the recipient box 410 may include drop down lists of others in the user's contacts list. Recipient box 410 may also include auto-complete capability for other users in the user's contacts list or a look-up directory for users. The lock button 416 may also be implemented with additional functionality. Through additional menus, the user may be able to lock the comment for some other users but not for others. Furthermore, the layout of the slide object creation user interface may take a variety of forms and may be customizable by the user.

Figure 5:
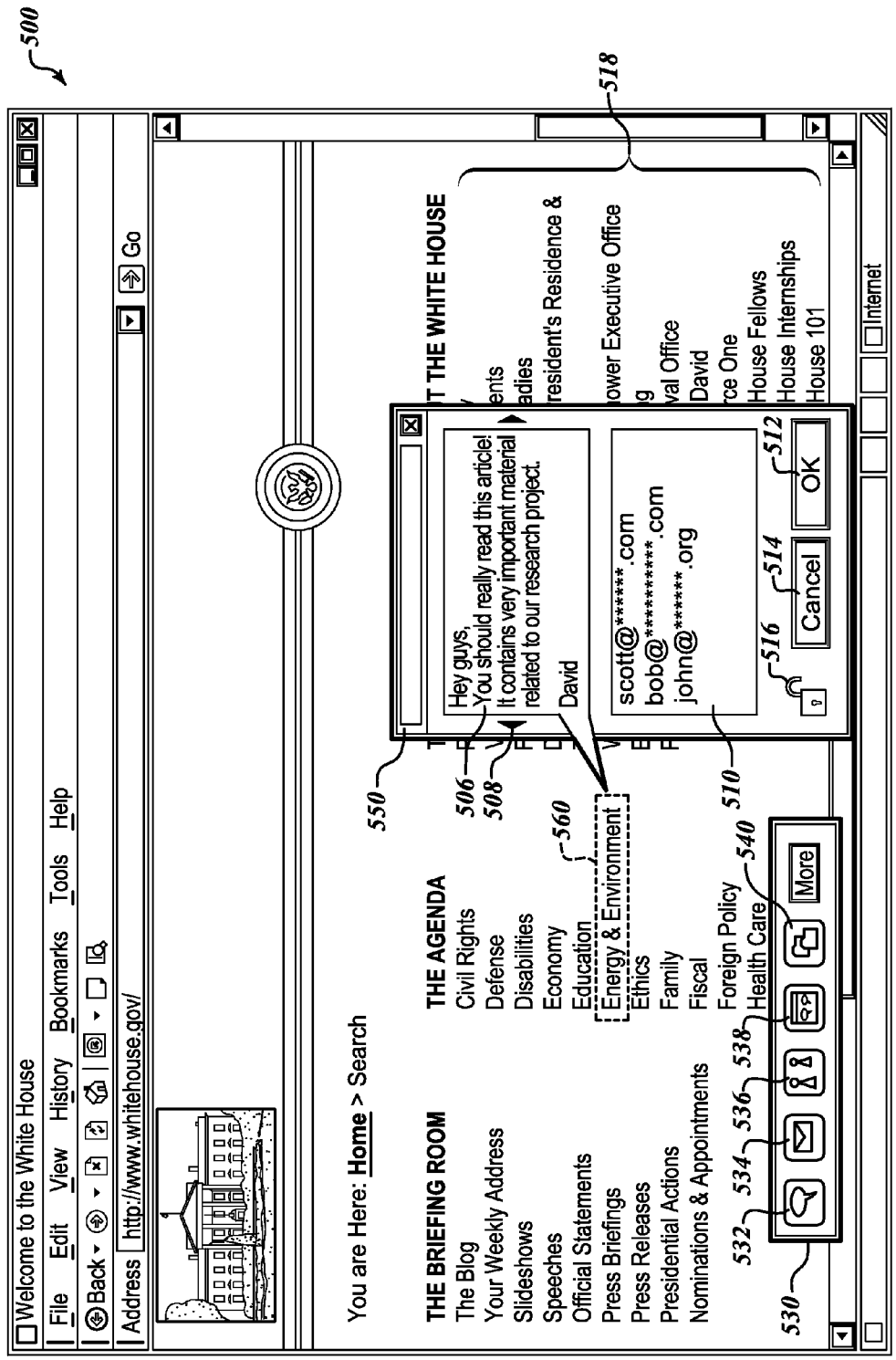
FIG. 5 illustrates an example graphical user interface showing a browser based plug-in application for creating a slide object as it would appear along with a target webpage in accordance with an embodiment.

FIG. 5 illustrates an example web browser screenshot 500 in accordance with an embodiment in which a user is adding a slide object including a comment to a webpage. The screenshot 500 includes a typical browser view of a website complete with hyperlinked text 518. The toolbar 530 of particular embodiments is shown in the lower left hand corner of the main viewing window of the browser. The toolbar may include several buttons such as, by way of example, a 'new comment' button 532, a 'notification' button 534, a 'contacts' button 536, a 'this page' button 538, a 'settings' button 540 and a 'more' button. In the illustrated embodiment, the slide creation user interface shell 550 is also displayed, superimposed over the webpage. The comment creation user interface shell includes the message input shell 506 along with the scrolling tabs 508, the recipient box 510, and the OK 512, Cancel 514, and Lock 516 buttons. In this illustration, the text has already been typed in the message box 506 and the recipients are already listed in the recipient box 510. FIG. 5 also illustrates a method of placement for the comment used in an example embodiment. In this particular example, the comment in the slide object is directed to the text "Energy & Environment" 560, located on the webpage. Once the shell 550 is displayed in the browser window, the user can position it anywhere on the browser window. By lining up the tip of the message box 506 with the right-hand side of the Energy & Environment text 560, the user may ensure that the completed comment will by tied or anchored to that portion of the text (e.g., to the underlying DOM node(s)) when the webpage is viewed later by him or herself or other users viewing the page. However, various embodiments are not limited to this technique of slide object placement as other techniques can also be used alternatively or in addition to the technique just described.

Figure 6:
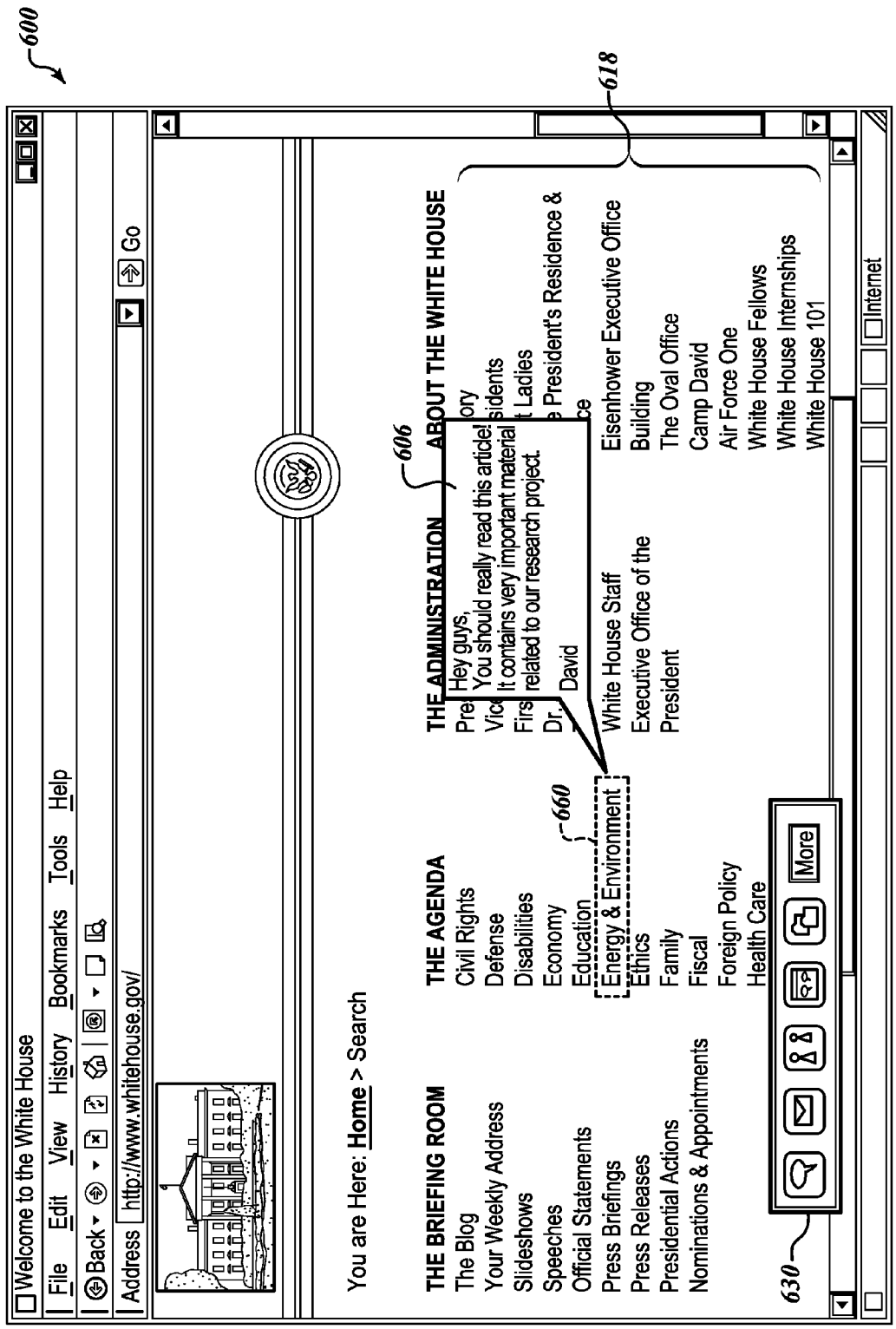
FIG. 6 illustrates an example graphical user interface showing a web browser displaying a webpage with a comment and a browser based plug-in application in accordance with an embodiment.

FIG. 6 shows an example screenshot 600 of an example webpage presented in a browser along with a comment 606 and the toolbar 630 in accordance with an example embodiment. In the illustrated embodiment, the website displayed in the viewing window of the browser also includes hyperlinked text 618. A slide object is anchored to the "Energy & Environment" text 660 shown in the middle of the screen. As described above, in some implementations, the slide object is not actually part of the website or the underlying markup language code (e.g., HTML, XML, XHTML, etc.) on which it is viewed and anchored. That is, as described above in particular embodiments, the underlying HTML of the website is not altered when the slide object is created and placed. Rather, the plug-in application 230 reads the DOM representation of the page and modifies the DOM representation in order to affect a rendering of the slide object (including comments, graphics, etc.) over the underlying page content. More particularly, the application 230 anchors the slide object to the DOM representation of the underlying HTML. Therefore, the application 230 does not affect the underlying HTML, although for some browsers, such as Firefox™ the slide object is included in the DOM representation.

In particular embodiments, the plug-in software that is responsible for the slide object creation toolbar and the slide object creation user interface shell is also responsible for downloading all applicable slide objects affiliated with the website presently being viewed in the browser by the user and displaying them in their proper locations along with the content of the website. Alternatively, in other embodiments or implementations, separate plug-ins are responsible for different aspects. For example, a plug-in may be responsible for the creation of the slide objects while another plug-in is responsible for displaying them. The slide objects are overlaid or superimposed on the website page. In an alternate embodiment, if a user has created a screenshot of the underlying content, the screenshot is uploaded to a separate set of static data servers (SDS) which remains separate from the mid-tier 122 and back-end 124 servers. The SDS has direct communication to transmit static data, such as images, with the client without the need of a mid-tier server.

Figure 9:
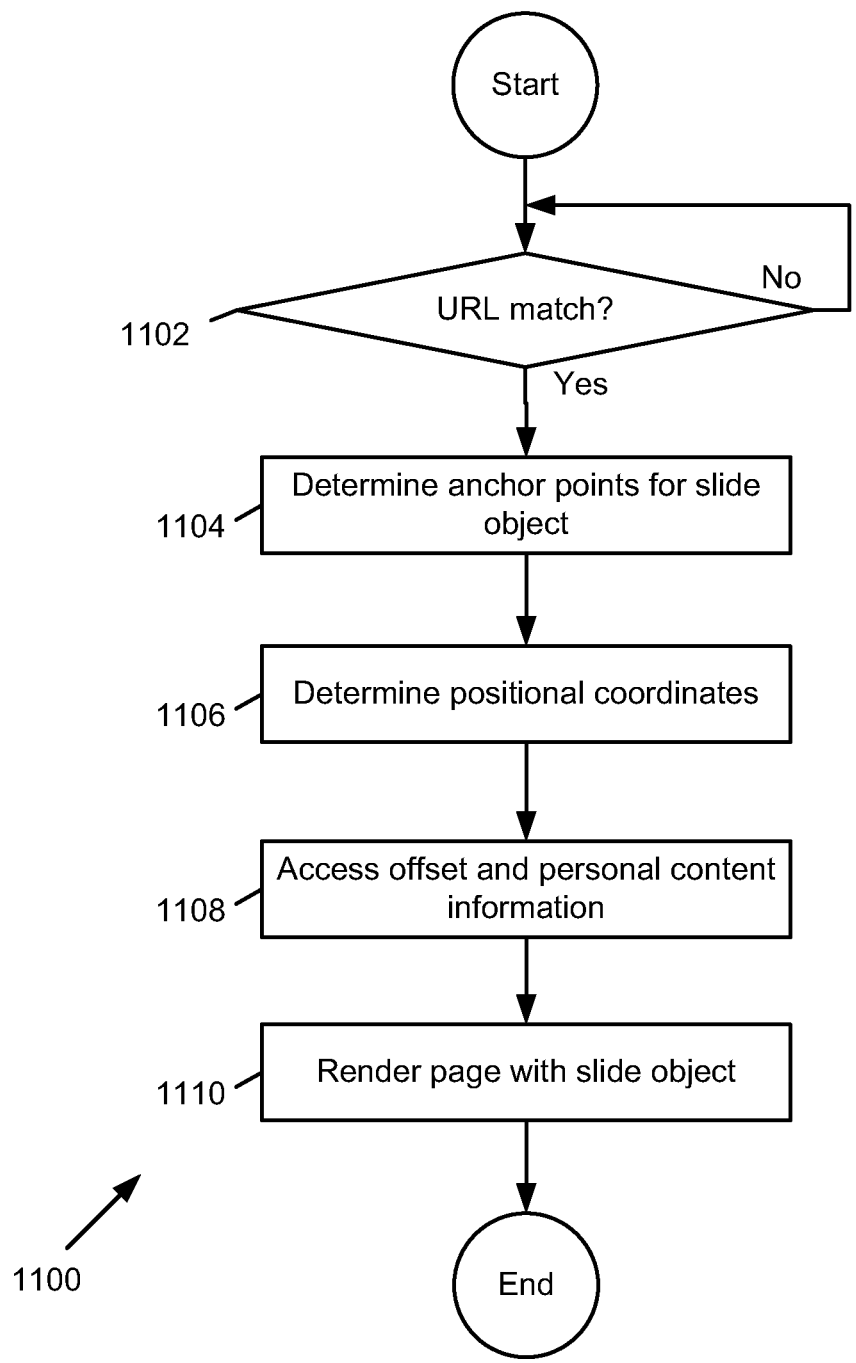
FIG. 9 shows a flowchart illustrating an example process for rendering a web page including one or more slide objects in accordance with an embodiment.

In one example embodiment, the slide objects may also be stored locally at the client device 102 and loaded by the plug-in software as the user visits websites. The anchoring of the slide objects may take several forms. In one particular embodiment, the position of the slide object is specifically tied to an object (e.g., an HTML element) or set of objects on the webpage. When the webpage is loaded, a routine of the software parses the HTML code and finds the slide object(s) and their corresponding anchor points (e.g., underlying DOM node(s)). More particularly, suppose a page is requested that includes one or more slide objects generated by the current user or one of the user's contacts who have specified that the current user may view his or her slide objects. An example process 1100 for rendering one or more slide objects over a requested structured document (e.g., such as a web page) is described with reference to FIG. 9. As described above, when a target page is requested and HTML or other markup language content is received by a browser to render the target page, the browser may first construct a corresponding DOM representation of the underlying web content. The browser then renders the target page using the DOM representation. In particular embodiments, in parallel with the DOM construction or the rendering, application 230 first determines if there is a URL match at 1102. In one implementation, the URL match can match to an entire URL or to a sub-string or pattern of a URL. In another embodiment, application 230 may also determine whether one or more aspects of the page match a set of anchor point definitions of one or more slide objects in addition to, or in lieu of, a URL matching process. By way of example, application 230, based on slide object information stored locally or remotely, first determines whether or not there are slide objects to be rendered over the target page. If there are slide objects, process 1100 proceeds at 1104 with determining which DOM nodes represent anchor points of corresponding slide objects. By way of example, this determination at 1104 may be performed by application 230 prior to, in parallel with, or after the DOM nodes are first rendered by the browser (this step may also be continuously or periodically performed during a user's browsing session). In response to a determination that a DOM node is associated with an anchor point, application 230 may call getBoundingClient Rect at 1106 to retrieve the positional coordinates of the bounding box(es) surrounding the DOM node(s) associated with the anchor point(s) based on the current size and aspect ratio of the current browser viewing window. At 1108, application 230 accesses any offset information as well as the personalized content to be displayed within the slide object, among other information used to render the slide objects. Application 230 then causes the content of the slide object(s) to be rendered at 1110 over target page content in the position specified by step 1106 and in conjunction with any stored and retrieved offset specified by the slide object creator and potentially in conjunction with a border of the viewing window (e.g., the position of the displayed comment may change based on the current position of the rendered anchor object relative to the border of the viewing window). In another embodiment, each webpage, to which one or more slide objects has been added, is broken into a standard Cartesian grid. When a slide object is created and placed by a user on the webpage, the location is stored in coordinate form along with the content of the comment. When the webpage is displayed again, the coordinates of the slide object are used to properly position the slide object with respect to the content on the page.

It should be noted that, in some example embodiments, when the client viewing window is resized or re-shaped, the application 230 may have to re-query the browser (and the getBoundingClientRect API) to retrieve the new DOM coordinates of the anchor point DOM nodes. However, scrolling or otherwise traversing a given page rendered in the client viewing window generally doesn't change the DOM representation, and hence, the application 230 does not have to re-query the browser for new DOM coordinates. More specifically, when a page is rendered within a particular client viewing window, the entire page is translated into a DOM representation, not just the rendered portion.

Figure 7:
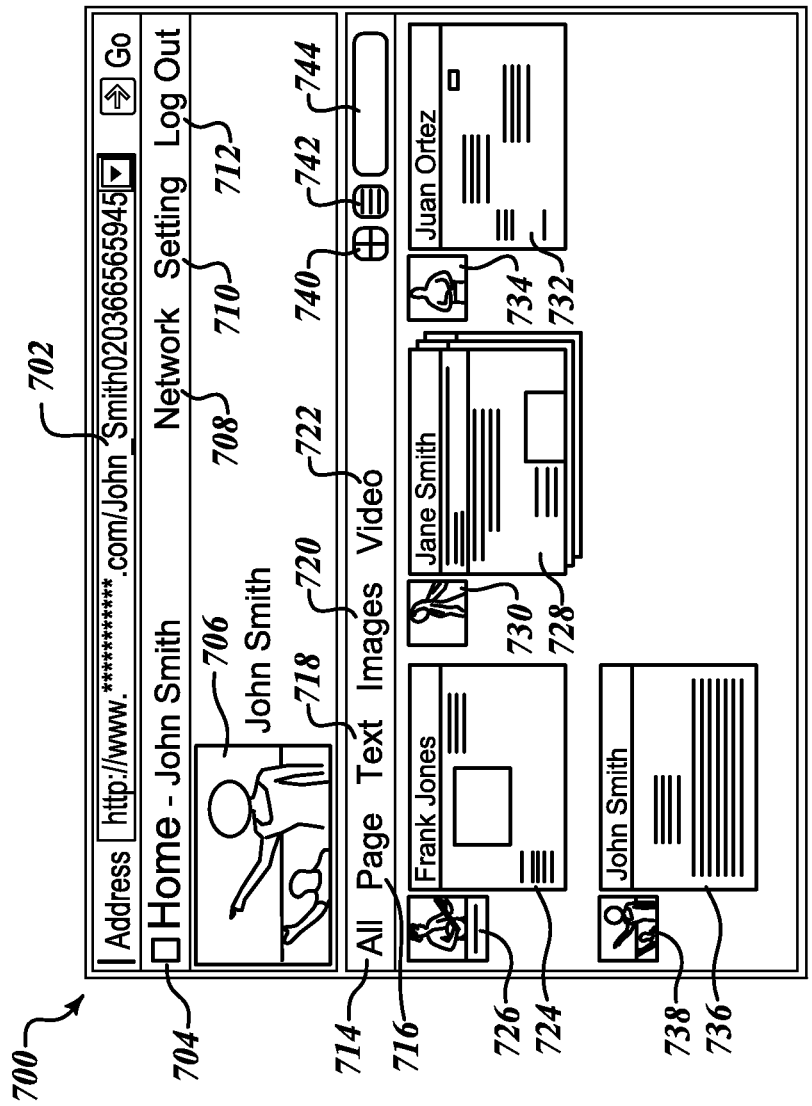
FIG. 7 illustrates an example graphical user interface showing a personal website homepage in accordance with an embodiment.

FIG. 7 depicts an example personal 'home page' or website 700 of the user in accordance with an embodiment. The 'home page' may be accessed through a browser in a similar fashion to other websites. The URL for the 'home page' is shown in the address bar of the web browser 702. In the top page of the viewing window the browser is the primary user toolbar 704. Displayed in this toolbar is the user's name as well as several menu options including but by no means limited to Network 708, Setting 710, and Log Out 712. The Network button contains options allowing the user to update his contact list, create lists or groups of contacts, or delete contacts. The network button may also include options that allow a user to create a list of his favorites and manage slide objects from these individual users. The Setting button allows the user to manage his own account. This button includes menus with options that allow the user to change his contact information and his billing information. The Log Out button allows the user to log out of the webpage with a single click. The list of buttons shown in the main pane of FIG. 7 is meant to be representative and in no way should it be considered limiting or exhaustive. Other options can also be added to the menus. Also, other buttons can be added to this toolbar as well. For instance, in one embodiment, a privacy button could be available that allows a user to control how much personal information is made available to other users or third party vendors. Alternatively, privacy settings could be located under another button such as Network 708 or Setting 710. The home page may also contain the avatar for the user 706. The avatar can be a picture, a drawing, or some other representation chosen by the user. If the user does not choose an avatar, the avatar may be left blank or set to a default picture.

A toolbar may contain various menu options including All 714, Page 716, Text 718, Images 720, Video 722, the 'grid' button 740, the 'list' button 742, and a search window 744. The All button 714 provides the user with a list of options. Some of these options allow the user to handle interactions with all contacts listed in his directory or displayed on his webpage. The Page button 716 contains options that control the display of the user's home page. The Text 718, Images 720, and Video 722 buttons in concert allow the user to manage media on his home page. This media may have been generated by him or by others. These buttons include options that allow the user to save text, images, or video locally or to upload text, images, or video to the user's home page. In an embodiment, these buttons may contain search options that allow a user to search for a particular type of media. The grid button 740 allows the user to organize his contacts profiles as a grid. The list button 742 allows the user to his contacts profiles as a list. The text window 744 allows for searching for content from the homepage. This window can be used to search for users or slide objects. In an embodiment of the present invention, the text window 744 is enhanced to provide for more extensive searching. The user can use this search option to find slide objects by website location, date the slide object was made or updated, author name, text or any other attribute or data field of the slide object. Furthermore, users can be searched by name, attributes stored in their user profile, websites augmented via slides, or some other criteria.

In the lower pane of the browser viewing window, the profiles 724, 728, 732, and 736 of the user's contacts are displayed. Each contact profile display has a name attached to his profile and also has an avatar 726, 730, 734, and 738 displayed along with their profile. Comments made and content added in slide objects of each of the users are prominently displayed in their profiles 724, 728, 732, and 736. These slide objects can be listed in the manner of 724, 732, and 736. They can also be stacked like in profile 728. The user can also leave slide objects for other users through his homepage. This can be accomplished in various ways. In an embodiment, the user may click on a user profile and add a comment to a slide object through a message box interface. In an embodiment, the user may select an add comment button through one of the toolbars (not shown).

Figure 8:
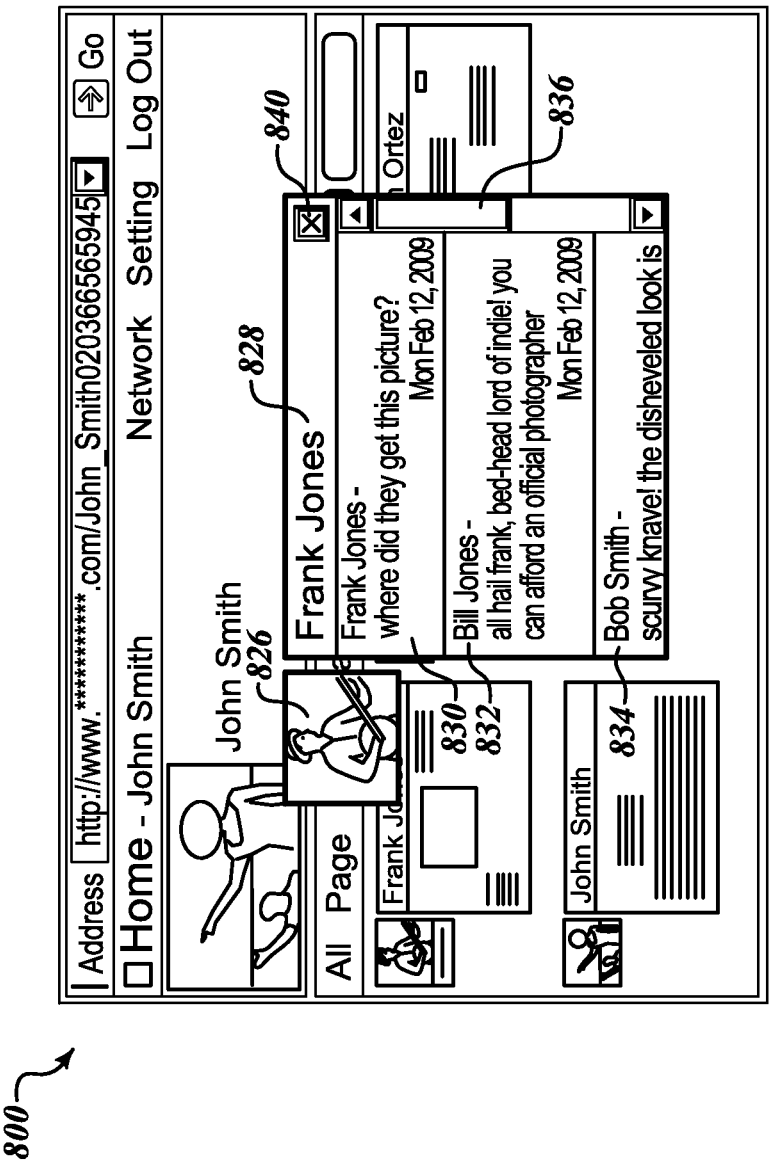
FIG. 8 illustrates an example graphical user interface showing a slide objects listing of a personal website homepage in accordance with an embodiment.

FIG. 8 shows a screenshot 800 of the user reading a set of comments embedded in a slide object associated with another user's profile. In this case the user is reading off a set of comments 830, 832, 834 embedded in a slide object of Frank Jones' profile. Frank's avatar 826 is also prominently displayed. When a set of slide objects or a conversation is selected, the comments and/or other content are displayed in a text reader 828. The text reader features an exit button 840 which when pressed causes the window to no longer be displayed. Also, the text reader features a slide bar that allows the user to scroll up and down bringing additional comments into the viewing window. These features are meant to be representative and are in no way limiting or exhaustive. In other embodiments, the text reader may include options allowing the window to be resized or moved. Furthermore, the text reader may include a text input feature which allows the user to add to the conversation from his home page. Also, in an embodiment, additional information may be presented along with the comment such as hyperlinks to the pertinent website.

Figure 10:
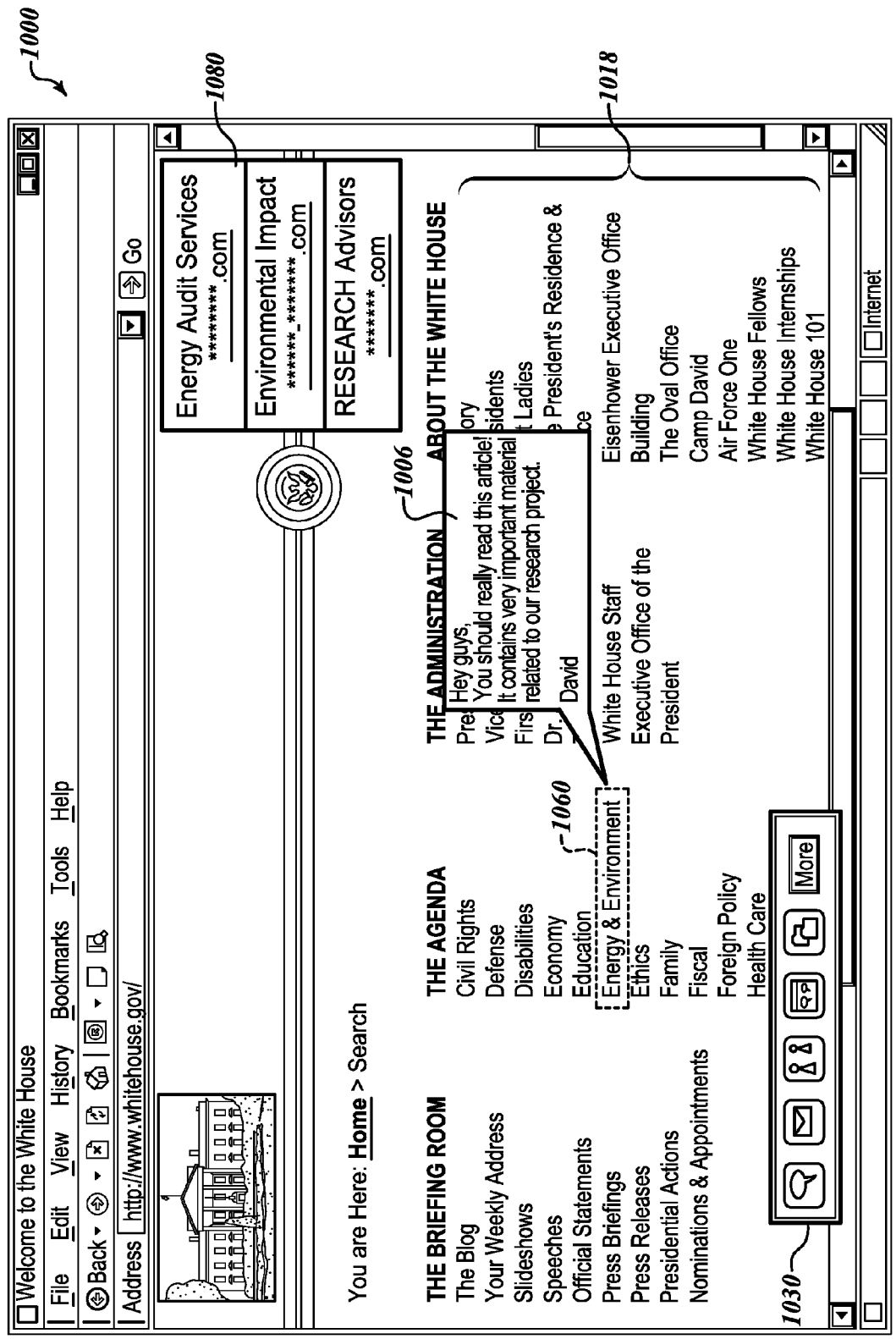
FIG. 10 illustrates an example graphical user interface of a web browser depicting a webpage with a slide object and a directed advertisement in accordance with an embodiment.

FIG. 10 shows a screenshot 1000 of the viewing window of a browser of an exemplary embodiment of the invention showing a directed advertisement 1080. Also displayed in the viewing window of the browser is a slide object including a comment 1006 attached to text 1060 also displayed in the window. Hyperlinked text 1018 is also displayed in the window. The main toolbar 1030 for generating comments in accordance with an embodiment of the invention is also shown. The advertisement is pertinent to the user and is added to the viewing window. While the advertisement in screenshot 1000 is text-based, the invention is not so limited. Advertisements can include audio, video, graphics and pictures or any combination thereof.

While the foregoing processes and mechanisms can be implemented by a wide variety of physical systems and in a wide variety of network and computing environments, the server or computing systems described below provide example computing system architectures for didactic, rather than limiting, purposes.

Figure 11:
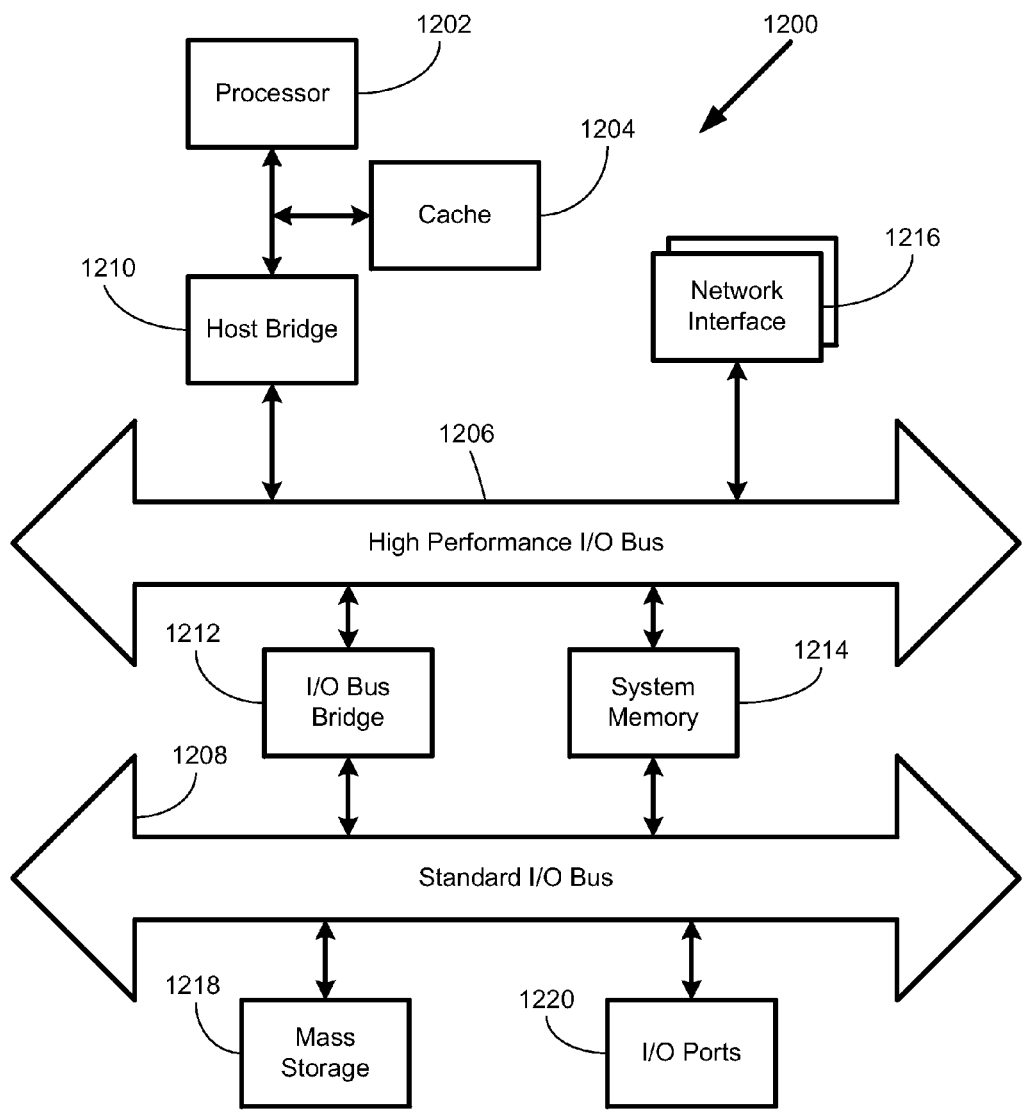
FIG. 11 illustrates an example computing system architecture.

FIG. 11 illustrates an example computing system architecture, which may be used to implement a server or a client host. In one embodiment, hardware system 1200 comprises a processor 1202, a cache memory 1204, and one or more executable modules and drivers, stored on a computer readable medium, directed to the functions described herein. Additionally, hardware system 1200 includes a high performance input/output (I/O) bus 1206 and a standard I/O bus 1208. A host bridge 1210 couples processor 1202 to high performance I/O bus 1206, whereas I/O bus bridge 1212 couples the two buses 1206 and 1208 to each other. A system memory 1214 and one or more network/communication interfaces 1216 couple to bus 1206. Hardware system 1200 may further include video memory (not shown) and a display device coupled to the video memory. Mass storage 1218, and I/O ports 1220 couple to bus 1208. Hardware system 1200 may optionally include a keyboard and pointing device, and a display device (not shown) coupled to bus 1208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1200 are described in greater detail below. In particular, network interface 1216 provides communication between hardware system 1200 and any of a wide range of networks, such as an Ethernet (e.g., IEEE 802.3) network, a backplane, etc. Mass storage 1218 provides permanent storage for the data and programming instructions to perform the above-described functions implemented in the servers or clients, whereas system memory 1214 (e.g., DRAM) provides temporary storage for the data and programming instructions when executed by processor 1202. I/O ports 1220 are one or more serial and/or parallel communication ports that provide communication between additional peripheral devices, which may be coupled to hardware system 1200.

Hardware system 1200 may include a variety of system architectures; and various components of hardware system 1200 may be rearranged. For example, cache 1204 may be on-chip with processor 1202. Alternatively, cache 1204 and processor 1202 may be packed together as a "processor module," with processor 1202 being referred to as the "processor core." Furthermore, certain embodiments of the present invention may not require nor include all of the above components. For example, the peripheral devices shown coupled to standard I/O bus 1208 may couple to high performance I/O bus 1206. In addition, in some embodiments, only a single bus may exist, with the components of hardware system 1200 being coupled to the single bus. Furthermore, hardware system 1200 may include additional components, such as additional processors, storage devices, or memories.

In one implementation, the operations of the server-side or client-side processes described herein are implemented as a series of executable modules run by hardware system 1200, individually or collectively in a distributed computing environment. In a particular embodiment, a set of software modules and/or drivers implements a network communications protocol stack, parallel computing functions, slide generating processes, and the like. The foregoing functional modules may be realized by hardware, executable modules stored on a computer readable medium, or a combination of both. For example, the functional modules may comprise a plurality or series of instructions to be executed by a processor in a hardware system, such as processor 1202. Initially, the series of instructions may be stored on a storage device, such as mass storage 1218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communications interface 1216. The instructions are copied from the storage device, such as mass storage 1218, into memory 1214 and then accessed and executed by processor 1202.

An operating system manages and controls the operation of hardware system 1200, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
    in connection with a target content object rendered by a client application of a client computing device comprising at least one processor:
    identifying one or more slide objects associated with but distinct from the target content object, the one or more slide objects defining a set of anchor point definitions in the target content object;
    identifying one or more anchor points, positional parameters and users' access control information corresponding to the one or more slide objects in a representation of the target content object based on the set of anchor point definitions, wherein identifying positional parameters comprising querying the client application for one or more positional coordinates associated with the one or more anchor points;
    accessing content corresponding to the one or more slide objects; and
    rendering at the client computing device the content of the one or more slide objects as an overlay to the target content object proximal to the identified anchor points according to the positional parameters and users' access control information.

2. The method of claim 1 wherein the content object is a structured document.

3. The method of claim 2 wherein the structured document is an HTML document.

4. The method of claim 3 wherein the representation is a document object model (DOM) representation.

5. The method of claim 4 wherein rendering the content comprises modifying the DOM representation by adding one or more HTML elements that are operative to cause a client application to render the one or more slide objects.

6. The method of claim 1 wherein the content for a first slide object of the one or more slide objects comprises multimedia content created by a first user; and wherein the rendering the content comprises delivering the multimedia content to the client application.

7. The method of claim 1 wherein identifying one or more slide objects comprises querying a remote database based on an identifier corresponding to the content object and a user identifier associated with a user of the client application.

8. A method comprising:
presenting, responsive to a command issued by a user at a client host computing device comprising at least one processor, a slide creation interface as an overlay to a content object rendered in a client application window;
in response to user input:
accessing, at the client host, content distinct from the content object and access control information inputted by the user via the slide creation interface;
determining one or more positional parameters based on one or more user inputs, said determining comprising querying the client application for one or more positional coordinates associated with the one or more anchor points;
creating a slide object comprising an identifier associated with the content object, the content and access control information inputted by the user and the one or more positional parameters; and
transmitting the slide object to a remote database.

9. The method of claim 8 wherein determining one or more positional parameters comprises accessing, at the client host, one or more target elements of the rendered content object selected by the user to define one or more anchor points.

10. The method of claim 9 wherein determining one or more positional parameters further comprises determining an offset between the one or more anchor points and a desired location of the slide object, and wherein the slide object further comprises the offset.

11. The method of claim 8 wherein the one or more target elements are text elements.

12. The method of claim 8 wherein the one or more target elements are multimedia objects embedded in the content object.

13. The method of claim 8 wherein the access control information comprises one or more user identifiers.

14. The method of claim 8 wherein the access control information identifies or corresponds to a group of users.

15. The method of claim 8 further comprising recording audio information generated by the first user and including the generated audio information in the content of the slide object.

16. The method of claim 8 further comprising recording video information generated by the first user and including the generated video information in the content of the slide object.

17. A system, comprising:
a user account database maintaining accounts for one or more users, each account including a user identifier;
a slide object database storing one or more slide objects, each slide objecting comprising an identifier associated with a content object, content distinct from the content object, access control information and one or more anchor points;
a computing device, comprising a memory, one or more processors, and computer program code stored on one or more non-transitory, computer-readable media, the computer program code comprising instructions operative to cause the one or more processors to:
store slide objects received from remote hosts associated with users identified in the user account database;
receive from a first user a request for an activity feed;
access, in response to the request, the slide object database to retrieve one or more slide objects for the first user, wherein the access control information associated with each slide object controls at least in part whether a slide object is retrieved for the first user;
transmit a response to the first user, the response including at least one of the retrieved slide objects;
track relationships between users of the system in user account database; and
control access to slide objects based on access control information of the slide objects and the relationships between users.

18. The system of claim 17 wherein the computer program code further comprises instructions operative to cause the one or more processors to:
receive a second request for one or more slide objects from a second user, wherein the request identifies a content object;
access, in response to the second request the slide object database to identify one or more slide objects that correspond to the content object; and
return one or more of the identified slide objects if the access control information of the one or more identified slide objects indicates that the second user is allowed access.

* * * * *